US008693812B2

(12) United States Patent
Ehrstrom et al.

(10) Patent No.: US 8,693,812 B2
(45) Date of Patent: Apr. 8, 2014

(54) STRUCTRUAL ELEMENT MADE OF AN ALUMINUM ALLOY INCLUDING AN OPTICAL SENSOR

(75) Inventors: Jean-Christophe Ehrstrom, Echirolles (FR); Laurent Cervi, Moirans (FR); Frank Eberl, Fontanil Cornillon (FR); Michelle Salvia, Ecully (FR)

(73) Assignee: Constellium France (FR)

( * ) Notice: Subject to any disclaimer, the term of this patent is extended or adjusted under 35 U.S.C. 154(b) by 772 days.

(21) Appl. No.: 12/050,888

(22) Filed: Mar. 18, 2008

(65) Prior Publication Data

US 2009/0184202 A1 Jul. 23, 2009

Related U.S. Application Data

(60) Provisional application No. 60/945,459, filed on Jun. 21, 2007.

(30) Foreign Application Priority Data

Mar. 23, 2007 (FR) ...................................... 07 02141

(51) Int. Cl.
*G02B 6/00* (2006.01)
*G02B 6/02* (2006.01)

(52) U.S. Cl.
USPC ............................................ 385/12; 385/123

(58) Field of Classification Search
USPC .............. 428/650; 244/119, 133; 385/12, 123
See application file for complete search history.

(56) References Cited

U.S. PATENT DOCUMENTS

| | | | | |
|---|---|---|---|---|
| 4,950,043 A * | 8/1990 | Russom | | 385/12 |
| 4,970,886 A * | 11/1990 | Sikora et al. | | 72/302 |
| 5,283,852 A | 2/1994 | Gibler et al. | | |
| 5,506,062 A | 4/1996 | Flammang | | |
| 5,525,796 A * | 6/1996 | Haake | | 250/227.15 |
| 5,805,757 A | 9/1998 | Bloom | | |
| 5,806,796 A * | 9/1998 | Healey | | 244/117 R |
| 7,687,764 B1 * | 3/2010 | Knapp | | 250/227.14 |
| 2001/0026362 A1 * | 10/2001 | Gleine et al. | | 356/32 |
| 2002/0071643 A1 * | 6/2002 | White | | 385/99 |
| 2004/0094242 A1 * | 5/2004 | Hoffmann et al. | | 148/421 |
| 2005/0151007 A1 * | 7/2005 | Cadogan et al. | | 244/35 R |
| 2005/0163414 A1 * | 7/2005 | Takeya et al. | | 385/12 |
| 2006/0142140 A1 * | 6/2006 | White | | 501/99 |

FOREIGN PATENT DOCUMENTS

| | | |
|---|---|---|
| EP | 0224598 | 6/1987 |
| GB | 2201914 | 9/1988 |
| JP | 05-091950 | 4/1993 |
| WO | WO 2004/017117 | 2/2004 |

OTHER PUBLICATIONS

Baldini et al ("Embedding fiber optic sensors in titanium matrix composites", SPIE vol. 1370 Fiber Optic Smart Structures and Skins III, 1990).*
International Search Report No. FR 0702141, dated Oct. 5, 2007, 2 pages.
Dictionary of Metallurgy (Colin D. Brown), Air hardening (pp. 4-5) and Internal friction (p. 121), Year: 1998.

* cited by examiner

*Primary Examiner* — Ryan Lepisto
(74) *Attorney, Agent, or Firm* — Miles and Stockbridge

(57) ABSTRACT

Provided herein is a method for manufacturing a worked product comprising a fiber sensor therein. Also provided is a wrought product comprising a fiber sensor as well as structural elements and other products including fuselage skin and a wing panel.

19 Claims, 5 Drawing Sheets

Figure 2a Test 1

Figure 2b Test 2

Figure 2c   Test 3

Figure 2d Test 4

Figure 3a   Test 5

Figure 3b   Test 7

Figure 3c   Test 8

Figure 3d   Test 9

Figure 4a Test 1

Figure 4b Test 2

Figure 4c Test 3

Figure 4d Test 4

Figure 5a    Test 5

Figure 5b    Test 7

Figure 5c    Test 8

Figure 5d    Test 9

STRUCTRUAL ELEMENT MADE OF AN ALUMINUM ALLOY INCLUDING AN OPTICAL SENSOR

CROSS REFERENCE TO RELATED APPLICATIONS

This application claims priority from U.S. Ser. No. 60/945,459 filed Jun. 21, 2007 and French Application No. FR0702141, filed Mar. 23, 2007, the contents of which are incorporated herein by reference in their entireties.

BACKGROUND OF THE INVENTION

1. Field of the Invention

The present invention relates to wrought products and structural members, made of an aluminium alloy, in particular for aircraft construction. Wrought products can be rolled products (such as thin sheets, medium sheets, thick sheets), extruded products (such as bars, extruded profiles, or tubes), and/or forged products.

2. Description of Related Art

Intelligent structures have shown that they were capable of having a broad range of applications likely to increase performance levels in the field of the aerospace industry. The information gathered by sensors built into the structure can have numerous applications linked both to flight as well as to the design or maintenance of devices.

In particular, the inclusion of sensors in structural members offers not only potential for improving how the health of a structure is monitored, but can also open up new design possibilities.

Thus, structural analysis of damage tolerance generally involves evaluating the number of stress cycles or peaks that the structure can withstand between the moment when a defect is detectable and the moment when this defect is sufficiently large to be deemed critical. Criticality can be judged on the basis of a calculation of instability, with the material R-curve according to ASTM E561, or on the basis of a judgment such as "the crack must not exceed two inter-smooth spaces." The number of stress peaks thus calculated, or number of flights for an aircraft structure, should be less than or equal to the anticipated inspection interval for the structure.

The detectable defect is often deemed as being one that can be visually detected. In a stiffened panel, it frequently comprises a crack in the skin of a few dozen millimeters, on either side of a stiffener which is itself cracked. Such being the case, the latter hypothesis is very detrimental to calculations. As a matter of fact, the load borne by the stiffener, due to the fact that it is presumed to be cracked, is transferred onto the skin which comprises the crack. The stress intensity factor applied to the crack is therefore significantly increased. Therefore, in order to ensure the anticipated inspection interval, one is led to increase the skin thickness, with a detrimental effect on the weight of the panel which can be estimated at 20%.

The addition of a sensor indicating whether the stiffener is broken or not would therefore contribute a weight gain on the order of magnitude mentioned above. This sensor can operate according to several physical principles: vibrations, currents and/or transmission of light.

The incorporation of a sensor into a metal structural member is difficult, in particular because of the risk of damaging the sensor or the structural member during manufacture.

It has been proposed to affix a sensor to the surface of the structural member.

U.S. Pat. No. 4,636,638 discloses the adhesive bonding of an optical fiber to the surface of a structural member in proximity to the primary sources of stress.

U.S. Pat. No. 5,525,796 discloses an improvement in the preceding method of the '638 patent, in which the optical fiber, surrounded by a metal sheath, is welded onto the surface of the structural member.

CA Patent Application No 2 334 051 discloses a method and a system for detecting temperature and mechanical strain by using a Bragg grating optical fiber deposited on a substrate and protected by a protective layer.

The attachment of the sensor to the surface of the structural member poses numerous problems: the sensor is sensitive to defects detected only on the surface, and it can be damaged accidentally. Furthermore, attaching the sensor to the surface requires steps that are long and costly, because they must be carried out during the final steps of manufacturing the aeroplane, in particular after surface treatment steps.

U.S. Pat. No. 5,283,852 proposes to incorporate an optical fiber into a protective tube when casting the metal. However, the deformation of the metal during the steps for deforming the casting, which are necessary for manufacturing the structural member, are likely to break the fiber, even in the presence of a protective tube. Furthermore, a fiber incorporated into a protective tube, which is not in direct contact with structural member, is not very sensitive to the stresses, or even to the fractures that the latter undergoes.

U.S. Pat. No. 6,685,365 proposes placing optical fibers between two sheets of aluminium and assembling them at a low temperature. This type of method, intended for the manufacture of optical cables, is not suited to the construction of structural members because the mechanical properties of the assembly are insufficient.

SUMMARY OF THE INVENTION

The problem to which this invention responds is that of incorporating a sensor in the form of a fiber into a structural element made of an aluminium alloy, without significantly altering the properties of the sensor and the structural member, so as to be able to detect damage to or fracturing of the structural element.

A first object of the present invention was to provide a method for manufacturing a worked product suitable for manufacturing a monolithic structural element made of an aluminium alloy. The method comprises assembling at least two metal subparts via hot deformation, wherein between the subparts, at least one sensor in the form of a fiber is incorporated. The sensor enables detection of damage to or fracturing of the structural element during use.

A second object of the invention was to provide a wrought product or a monolithic structural element made of an aluminium alloy. Within the structural element on wrought product, there is incorporated at least one sensor in the form of a fiber that enables detection of damage to and/or fracture thereof. The wrought product and/or monolithic structural element can advantageously be obtained by a process according to the present invention. Also advantageously, a portion on the entire surface of the sensor is in close contact with at least one aluminium alloy of the wrought product or structural element.

A third object of the present invention was to provide a fuselage skin or wing panel including a structural element according to the invention.

DETAILED DESCRIPTION OF A PREPARED EMBODIMENT

Figure 1:
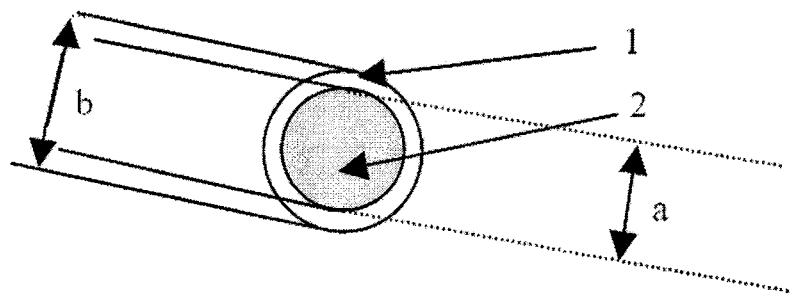
FIG. 1 is a schematic representation of an optical fiber.

Unless otherwise mentioned, the definitions of the European Standard EN 12258-1 apply.

The term "sheet" is used here for rolled products of any thickness.

The term "wrought product" refers to a semi-finished product ready to be transformed, in particular by sawing, machining and/or shaping into a structural member. In some cases, the wrought product can be used directly as a structural member. Wrought products can be rolled products (such as thin sheets, medium sheets, thick sheets), extruded products (such as bars, extruded profiles, or tubes), and forged products.

The term "structural member" or "structural element" refers to an element used in mechanical engineering for which the static and/or dynamic mechanical properties have a particular importance with respect to the performance and integrity of the structure, and for which a design for the structure is generally prescribed or made. For an airplane, these structural members include, in particular, the members which make up the fuselage (such as the fuselage skin, the fuselage stiffeners or stringers, the bulkheads, the circumferential frames, the wings (such as the wing skin), the stringers or stiffeners, the ribs and spars, and the tail unit consisting, in particular, of horizontal and vertical stabilisers), as well as the floor beams, the seat tracks and the doors.

The term "monolithic structural member" refers to a structural member that has been obtained from a single piece of wrought product, without being assembled with another part, such as by riveting, welding or adhesive bonding.

The present invention relates to a method for manufacturing a monolithic structural element made of an aluminium alloy, wherein which at least two metal subparts are assembled via hot deformation, after having incorporated between them at least one sensor in the form of a fiber. The fiber enables detection of damage to or fracturing of the structural element during use thereof. A monolithic structural element obtained by the method according to the invention possesses the characteristic that a substantial portion of the surface of the sensor is in close contact with at least one aluminium alloy of the structural element. A structural element according to the present invention is particularly advantageous for producing fuselage skin and/or wing panels. This is because a structural element of the present invention enables a weight gain on the order of about 20%. In fact, the present invention makes it possible to carry out a design analysis without having to make the assumption that the only detectable defects are defects that can be detected visually.

According to the invention, during a step for manufacturing a structural member made of an aluminium alloy, at least two metal subparts are assembled via hot deformation, after having incorporated between them at least one sensor in the form of a fiber enabling detection of damage to or fracturing of the structural member during the use thereof.

Thus, contrary to a widespread idea, it is possible to incorporate a sensor into the structural element during a hot deformation step of the manufacturing process without causing the sensor to break, while at the same time preserving satisfactory usage properties for the structural element.

The hot deformation ratio should preferably be sufficient to obtain a monolithic structural element.

So as to ensure close contact between the sensor and the aluminium alloy of the structural element, it is often desirable for the sensor to be inserted between at least two metal subparts intended to be assembled via hot deformation in order to form a single metal part. The metal subparts can be entirely separated prior to the deformation step, and/or they can also have material continuity. The metal subparts can be pre-assembled prior to hot deformation by adhesive bonding, welding, riveting or any other appropriate means capable of facilitating their bonding during the hot deformation process. Each subpart advantageously accounts for a significant volume, at least 10%, and preferably at least 15% of the final volume. The invention preferably relates to parts obtained from plates of billets made of an aluminium alloy, cast by semi-continuous casting, and not from parts obtained via powder metallurgy or sintering, because these latter techniques generally do not make it possible to obtain structural members of a quality sufficient for aeronautical applications. The method according to the invention makes it possible to incorporate a sensor within the wrought product or the structural member. Thus, within a plane perpendicular to the direction of any sensor in the form of a fiber, the minimum distance between this sensor and the surface of the wrought product or the structural member is advantageously greater than 0.5 mm or 1 mm, and preferably greater than 2 mm or even 5 mm, and even more preferably greater than 10 mm. In a preferred embodiment, the minimum distance between a sensor and the surface of the wrought product or the structural member, within a plane perpendicular to the direction of the fiber, is the greatest of the distances possible.

The hot deformation ratio is advantageously between 2% and 95% and preferably between 10% and 70%. By "hot deformation ratio," it is understood that this means the ratio between, on the one hand, the difference between the sum of the initial dimensions of the subparts and the final dimension of the product resulting from the hot deformation process, and, on the other hand, the sum of the initial dimensions of the subparts, these dimensions being taken in the principal direction of deformation, from the moment when the fiber is in contact with at least one subpart. For deformation by crushing or by rolling, the hot deformation ratio is equal to the ratio $(E_0-E_f)/E_0$ where $E_f$ is the final thickness and $E_0$ is the sum of the initial thicknesses of the subparts. For deformation by extrusion, the hot deformation ratio is equal to the ratio $(S_0-S_f)/S_0$ where $S_f$ is the final cross-sectional area and $S_0$ is the sum of the initial cross-sectional areas of the subparts. The hot deformation ratio during the hot deformation step is advantageously greater than 10% and preferably greater than 15%, so as to ensure the material continuity of the part obtained. However, if the hot deformation ratio is very high, it may be difficult to not damage the sensor. Thus, the hot deformation ratio is preferably lower than 70%, preferably lower than 40%, and even more preferably lower than 25%.

In the case of rolling, for example, it is known to assemble sheets by the cladding method, can be which two sheets are assembled during a hot rolling step. Hot forging also makes it possible to assemble two metal subparts.

When the sensor is inserted between two subparts intended to be assembled via rolling or forging, it can be advantageous to be able to make it fastened with at least one of the subparts.

In one embodiment of the invention, the sensor is placed inside a notch made in one of the two subparts, so as to be protected from direct contact with the other subpart during the deformation process. The width of the notch is preferably of the same order of magnitude as the diameter of the sensor, so that the latter is held in place during the deformation process. The notch is advantageously made with a laser beam, and the laser treatment is preferably followed by a deoxidizing-type surface treatment. In the case of extrusion, for example, co-extrusion methods are known, e.g., from U.S. Pat. No. 4,215,560 (incorporated by reference), in which a wire is inserted into the extrusion chamber between two subparts formed by the openings of a tool. In comparison with the starting billet, the subparts were already deformed when they came into contact with the wire. A suitable and desirable hot deformation ratio considered within the scope of the invention preferably and advantageously corresponds to the deformation ratio of the subparts from the moment when they are in contact with the fiber. A compromise can be found for inserting the fiber: premature insertion produces high tensile stress on the fiber because of the extrusion ratio, whereas late insertion may reduce the contact distance between the materials, which can result in gaps between the fiber and the structural element and in insufficient bonding of the subparts. In the case of extrusion, from FR 2 876 924 A1 (incorporated herein by reference), for example, it is also known to extrude composite billets including at least two subparts. The fiber can advantageously be inserted into a notch made in one of the subparts.

The hot deformation temperature is an important parameter of the method. The hot deformation temperature is advantageously between 350° C. and 550° C., and preferably between 450° C. and 500° C. As a matter of fact, if the temperature is too low, the sensor remains too brittle and it can frequently break in some cases during the deformation process. Furthermore, if the temperature is too low, there is a risk of not obtaining satisfactory material continuity between the two metal subparts. On the other hand, if the temperature is too high, the sensor properties may be damaged in some cases.

A preferred sensor in the form of a fiber is an optical fiber. Among all of the conventional sensors, optical fibers have numerous advantages. Thus, their operation is insensitive to electromagnetic interference. Their resistance to harsh environments (chemical, nuclear, vibrations, very high temperatures, at least if the sheathing and the core are not made of organic materials) is excellent. Furthermore, in the case of being inserted into metal structures, they do not require electrical insulation, since the fiber is insulating. They are both the sensing element and the vehicle of information, which gives them a very short response time.

An optical fiber carries light via reflection between its core and its sheath. A schematic representation of an optical fiber having a diameter of b is shown in FIG. 1. The core 2, having a diameter of a and a refractive index of $n_c$ is surrounded by a sheath 1 having a refractive index of $n_g$. The core and the sheath are characterised by their different refractive indices (step-index fiber). However, fibers exist for which this difference is not expressed in the form of a step index, but by a graded index.

A distinction is made between two large families of optical fibers: monomode and multimode. These two types of fibers are characterised by their geometry, in particular the diameter of the core, their optical properties, in particular the refractive indices of the core and the sheath, as well as their operating condition, in particular the wavelength of the light guided along the fiber.

Monomode fibers have excellent transmission characteristics: high bandwidth and high speed, and they are widely used in the telecommunications industry. Multimode fibers have a relatively large core diameter, i.e., larger greater than 10 μm, which simplifies experimental design (connections and alignment with the light source), and a large numerical aperture (maximum angle that the guided ray forms with the axis of the fiber).

The transmission or the absence of transmission of light through the optical fiber makes it possible to detect fracturing of the structural element. This binary response can be obtained with all types of optical fibers. Furthermore, modification of the light-transmitting properties of the optical fiber, due to stress, even prior to its breakage, makes it possible to detect damage to the structural element, but this complex response is more easily obtained with monomode optical fibers.

Despite this characteristic of monomode fibers, it is advantageous to use a multimode optical fiber, because these sensors resist high temperatures and heavy deformation. However, they require strong luminous intensity. Advantageously, a multimode fiber can be used and the total diameter b is preferably from 30 to 500 μm and preferably from 50 to 150 μm or 130 μm. In another embodiment of the present invention, a monomode optical fiber can be used, which incorporates interferometers (e.g., Fabry-Perot interferometers) or Bragg gratings. Preferably, a multimode fiber with a silica glass core and sheath is used, because of its resistance to temperature and its less localised nature with respect to measuring deformation than a Bragg grating.

The method according to the invention does not always require that the sensor be covered with a protective covering. In particular, a metal protective covering is not always required to enable insertion of the sensor. In the case of optical fibers, the production of a metal covering is expensive, and the invention makes it possible in some embodiments to do without this step. In one advantageous embodiment of the invention, the entire surface of the sheath 1 of the multimode optical fiber used is in close contact with an aluminium alloy of the wrought product or structural member. In another embodiment of the invention, a fiber covered with a protective covering such as a metallic covering, preferably a copper covering or a polymeric covering, preferably a polyimide covering. The protective covering enables in some instances an easier handling of the fibers and to avoid fiber break during hot working.

A preferred deformation temperature of from 350° C. to 550° C. is particularly advantageous when the sensor is an optical fiber and, in particular, a multimode optical fiber. Frequent breakages of the optical fiber may be observed for deformation temperatures lower than 350° C., or even lower than 450° C. Damage to the optical fiber may be observed when the temperature exceeds 550° C.

A compromise exists between the hot deformation ratio and the deformation temperature: a high deformation temperature, for example, makes it possible to use lower hot deformation ratios.

In a preferred embodiment of the invention, the following successive steps can be carried out:
a) casting of a billet made of a 2XXX, 6XXX or 7XXX alloy,
b) optional blending,
c) co-extrusion with a multimode optical fiber at a temperature of between 350° C. and 550° C.,
d) solution heat treatment,
e) hardening, f) controlled stretching.

g) optionally aging

A method according to the present invention enables the manufacture of a wrought product made of an aluminium alloy intended for the manufacture of a monolithic structural element made of an aluminium alloy within which is incorporated at least one sensor in the form of a fiber, enabling detection of damage to or the fracturing of the structural element. Preferably a large portion or even the entire surface of the sensor is in close contact with at least one aluminium alloy of the wrought product. As a matter of fact, incorporation of the sensor during the hot deformation step makes it possible to achieve close contact at virtually every point.

A method according to the present invention can be used to fabricate wrought products, preferably sheets and extruded profiles, and structural elements made of any wrought aluminium alloy. In particular, the invention can be used with non-heat-treatable alloys, such as the 1XXX, 3XXX, 5XXX alloys and certain alloys of the 8XXX series, and advantageously also with 5XXX alloys containing scandium, with a preferred concentration of 0.001 to 5% by weight of Sc, and even more preferably 0.01 to 0.4% Sc or even about 0.3% Sc by weight.

A heat-treatable aluminium alloy is preferably used. In particular, the invention is advantageous to be used to fabricate wrought products or structural elements including one or more aluminium alloys chosen from 2XXX, 4XXX, 6XXX, 7XXX and 8XXX alloys containing lithium.

The wrought product advantageously comprises a sheet. In one advantageous embodiment of the present invention, the structural member is obtained by integral machining of a sheet according to the invention. In the case of fuselage sheets, which frequently comprise a cladding, the sensor is advantageously inserted between the core and the cladding. In one advantageous embodiment of the invention, it is also possible to insert the sensor at the positions which, after integral machining, will become integral stiffeners.

The wrought product is preferably an extruded profile intended to be used as a stiffener in the aircraft industry.

A structural element according to the present invention is particularly advantageous for producing a fuselage skin or wing panel, because it enables a weight gain on the order of about 20%. It is possible to carry out design analysis without having to make the assumption that the only detectable defects are defects that can be detected visually by employing the present invention. Furthermore, since a sensor can be inserted into the structural element, the sensor is sensitive to the breaking of the element, without necessarily being affected by accidental damage like a sensor would be if attached to the surface. Furthermore, since the sensor is generally completely surrounded by the aluminium alloy of the structural element, it is protected during the manufacturing steps following the hot deformation process, e.g., such as a machining step or a surface treatment step.

However, the present invention is not limited the structural members intended for aeronautical applications. A structural member according to the present invention can also find advantageous applications in aerospace construction, shipbuilding, the construction of bridges and buildings, and other fields.

EXAMPLE

In this example, a sheet was made, within which an optical fiber was incorporated. Nine batches from two samples made of an AA6056 alloy were machined to the following dimensions: 100 mm×17 mm×0.8 mm et 100 mm×17 mm×1.6 mm. A notch having a width of 150 µm and a depth of 150 µm was produced by a laser in the lengthwise direction, in the sample having a thickness of 0.8 mm. A deoxidizing-type surface treatment was carried out after the laser treatment. A multi-mode optical fiber with a silica glass core and sheath, having a total diameter of 100 µm was inserted into each notch.

Figure 2:
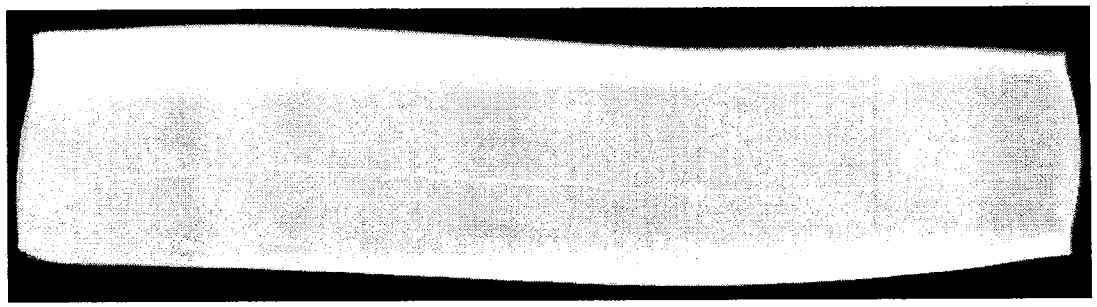
FIG. 2 provides the radiographs obtained for the samples 1 (FIG. 2a), 2 (FIG. 2b), 3 (FIG. 2c) and 4 (FIG. 2d).
Figure 2:
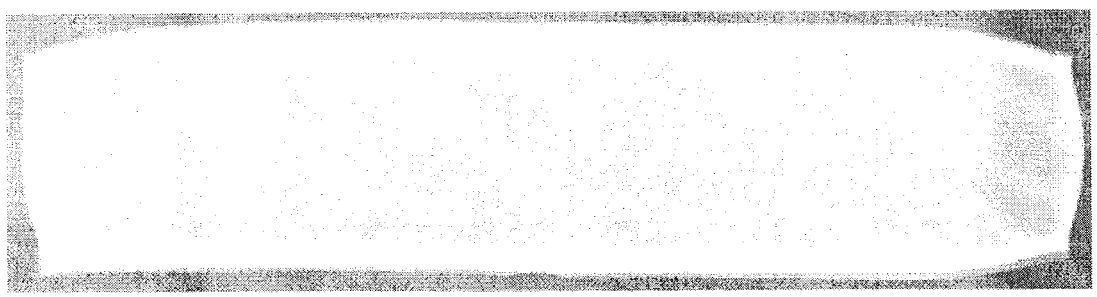
Figure 2:
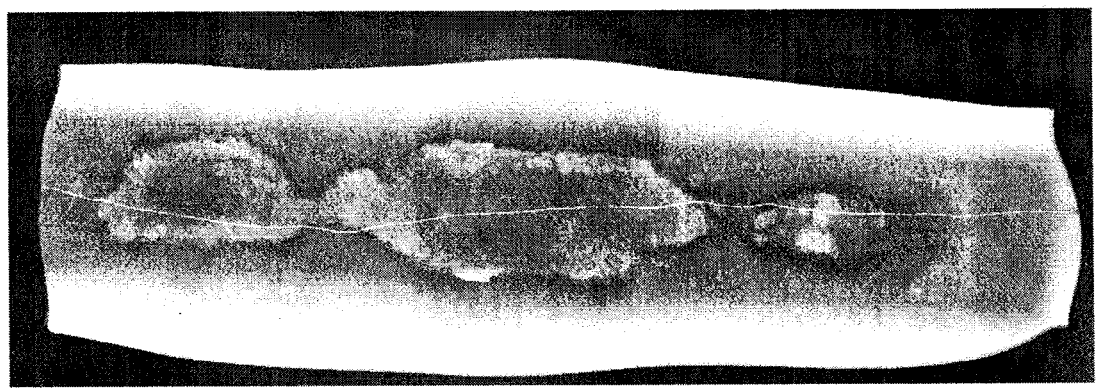
Figure 2:
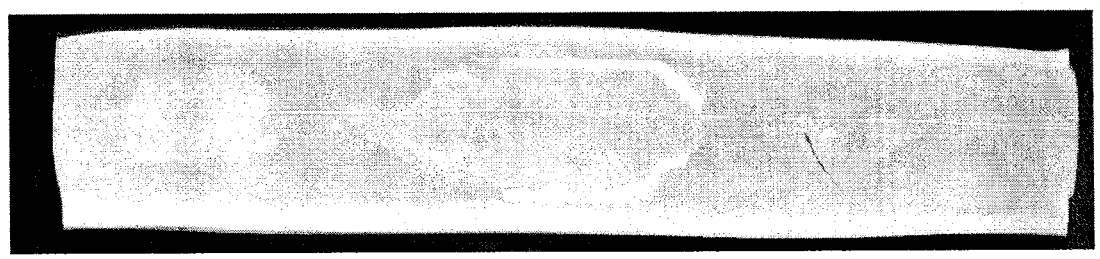
Figure 3:
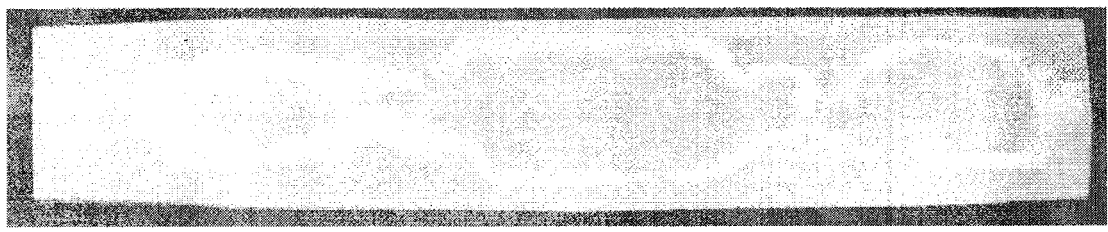
FIG. 3 provides the radiographs obtained for the samples 5 (FIG. 3a), 7 (FIG. 3b), 8 (FIG. 3c) and 9 (FIG. 3d).
Figure 3:
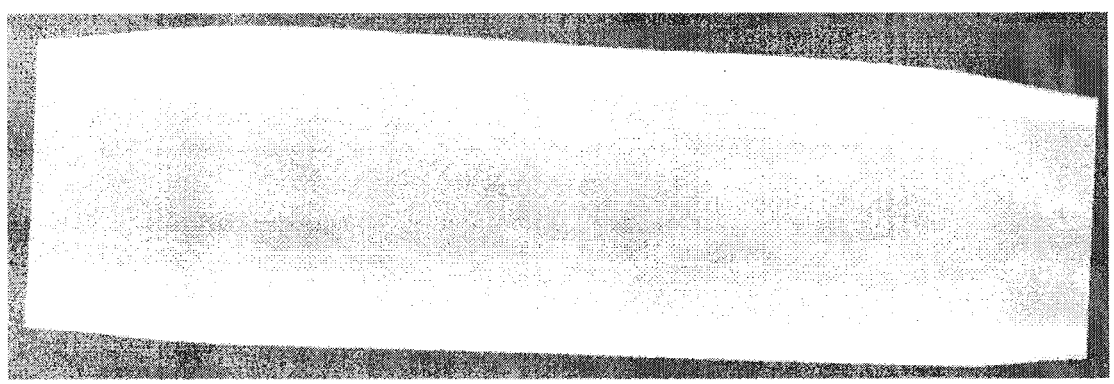
Figure 3:
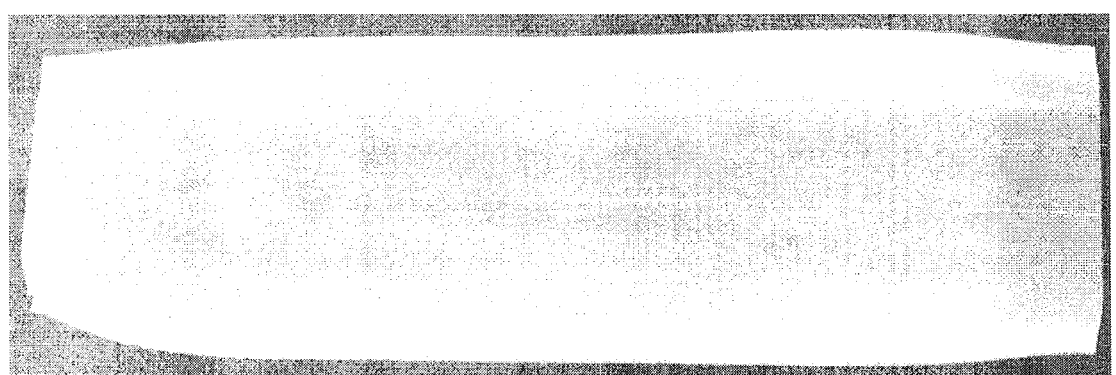
Figure 3:
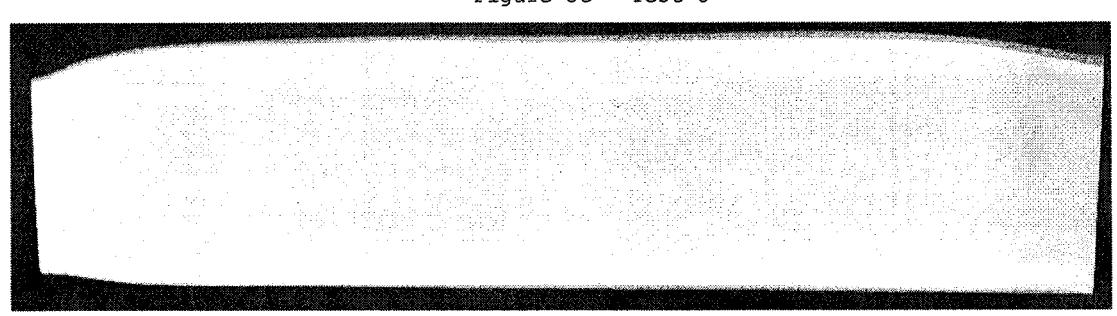
Figure 4:
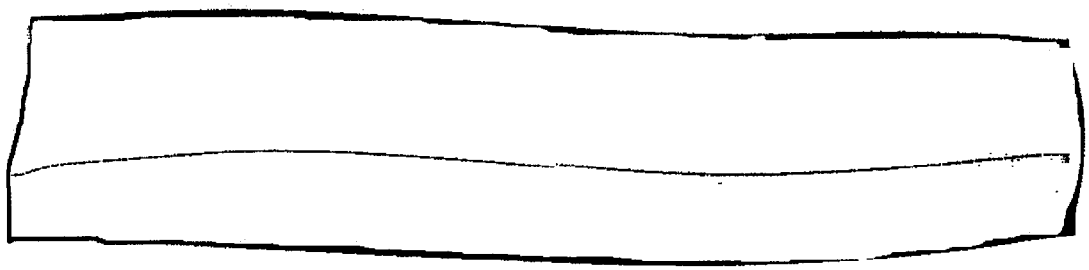
FIG. 4 is a negative simplified view of FIG. 2 for the samples 1 (FIG. 4a), 2 (FIG. 4b), 3 (FIG. 4c) and 4 (FIG. 4d).
Figure 4:
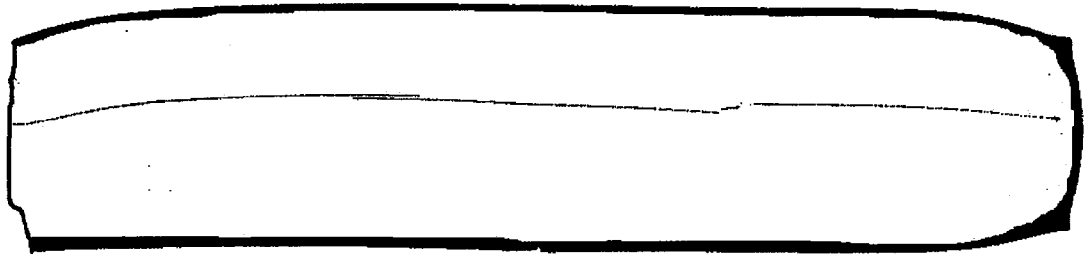
Figure 4:
Figure 4:
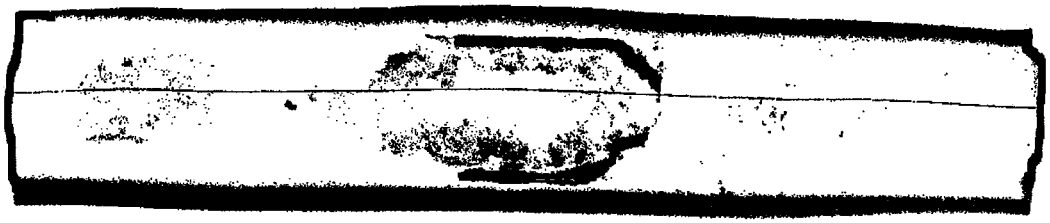
Figure 5:
FIG. 5 is a negative simplified view of FIG. 3 for the samples 5 (FIG. 5a), 7 (FIG. 5b), 8 (FIG. 5c) and 9 (FIG. 5d).
Figure 5:
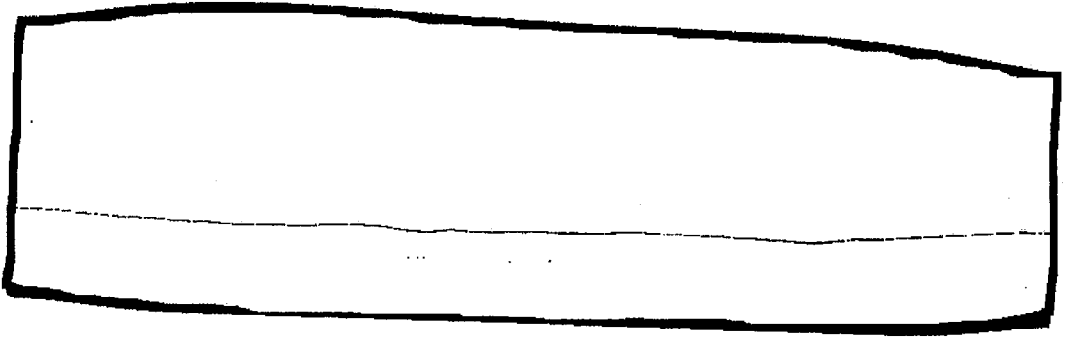
Figure 5:
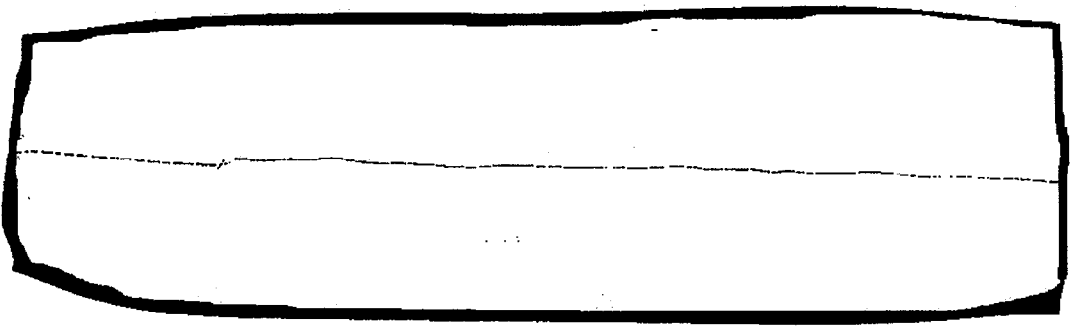
Figure 5:
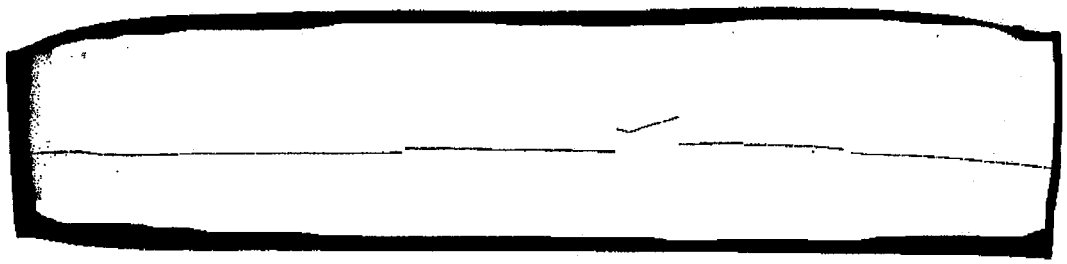

A stack consisting of a sample having a thickness of 0.8 mm, into which the optical fiber was inserted, and a sample having a thickness of 1.6 mm was heat-deformed via crushing on a "Servotest"® type machine. The tests were carried out at two temperatures: 400° C. and 475° C. All of the tests made it possible to assemble the samples, with the exception of test No. 6, for which the transformation conditions did not make it possible to assemble the two samples. After hot deformation, the samples were radiographed in order to observe the condition of the fiber. The radiographs thus obtained for the tests, in which the entire sample is observed as a plan view, are shown in FIGS. 2 and 4 (tests 1 to 4) and FIGS. 3 and 5 (tests 5 and 7 to 9). In one case, a test was carried out in order to verify that the fiber was transmitting light. All of the results obtained are provided in Table 1.

TABLE 1

| Test No. | Crushing (mm) | Hot deformation Ratio (%) | Temperature (° C.) | Condition of the fiber (radiographic observation) | Light transmission |
|---|---|---|---|---|---|
| 1 | 1.03 | 43% | 475 | Broken | Untested |
| 2 | 1 | 42% | 475 | Broken | Untested |
| 3 | 1.53 | 64% | 475 | Seems intact | Untested |
| 4 | 0.62 | 26% | 475 | Seems intact | Untested |
| 5 | 0.4 | 17% | 475 | Seems intact | Yes |
| 6 | 0.44 | 18% | 400 | | |
| 7 | 1.65 | 69% | 400 | Broken | Untested |
| 8 | 1.65 | 69% | 400 | Broken | Untested |
| 9 | 1.03 | 43% | 400 | Broken | Untested |

In the majority of cases, by employing hot deformation at the temperature of about 475° C., it was possible to obtain an intact fiber. Hot deformation ratios of 17% and 26 appear particularly advantageous.

The invention claimed is:

1. An airplane monolithic structural element comprising at least two metal subparts that were assembled via hot deformation, with a hot deformation ratio between 2% and 95%, and said airplane monolithic structural element further comprising an aluminium alloy, wherein incorporated within said airplane monolithic structural element there is provided at least one sensor in the form of a fiber, said sensor enabling detection of damage to and/or fracture of the structural element and wherein a substantial portion of a surface of said sensor is in contact with at least one aluminium alloy of said airplane monolithic structural element, and wherein said sensor is incorporated between said at least two metal subparts.

2. A method for manufacturing an airplane monolithic structural element of claim 1 comprising at least two metal subparts that were assembled via hot deformation, with a hot deformation ratio between 2% and 95%, and said airplane monolithic structural element further comprising an aluminium alloy, said method comprising assembling the at least two metal subparts via hot deformation, wherein the sensor in the form of a fiber is incorporated between said subparts, said sensor enabling detection of damage to and/or fracture of the structural element during use thereof.

3. A method as claimed in claim 2, wherein the temperature can be any value from 350° C. to 550° C. during said hot deformation.

4. A method as claimed in claim 2, wherein said sensor in the form of a fiber comprises a multimode optical fiber.

5. A method of claim 4, wherein said fiber has a diameter from 30 to 500 μm.

6. A method as claimed in claim 4, wherein a core and a sheath of said fiber comprise silica glass.

7. An airplane monolithic structural element of claim 1, wherein a distance between said sensor and a surface of the airplane monolithic structural element, in a plane perpendicular to a direction of said sensor, is at least about 1 mm.

8. An airplane monolithic structural element as claimed in claim 1, wherein said sensor comprises a multimode optical fiber.

9. An airplane monolithic structural element of claim 8, wherein said fiber has a diameter of from 30 to 500 μm.

10. An airplane monolithic structural element as claimed in claim 8, wherein a core and a sheath of said fiber comprise silica glass.

11. An airplane monolithic structural element as claimed in claim 10, wherein a substantial portion of a surface of the sheath of the fiber is in contact with at least one aluminium alloy of said product.

12. An airplane monolithic structural element as claimed in claim 1, comprising an aluminium alloy selected from the group consisting of the 2XXX, 4XXX, 6XXX, 7XXX and 8XXX alloys containing lithium.

13. A fuselage skin panel comprising an airplane monolithic structural element of claim 1.

14. A wing panel comprising an airplane monolithic structural element of claim 1.

15. An airplane monolithic structural element of claim 1 which has been produced by a process comprising assembling the at least two metal subparts via hot deformation, wherein the sensor in the form of a fiber is incorporated between said subparts, said sensor enabling detection of damage to and/or fracture of the structural element during use thereof.

16. An airplane monolithic structural element of claim 1 wherein the entire surface of said sensor is in contact with at least one aluminium alloy.

17. The airplane monolithic structural element of claim 1, wherein said airplane monolithic structural element is selected from the group consisting of a fuselage, a fuselage skin, a fuselage stiffener, a fuselage stringer, a bulkhead, a circumferential frame, a wing, a wing skin, a stringer, a stiffener, a rib, a spar, a tail unit, a floor beam, a seat track, and a door.

18. The airplane monolithic structural element of claim 1, wherein said at least two metal subparts are assembled via a hot deformation ratio of greater than 10%.

19. An airplane monolithic structural element comprising:
at least two metal subparts that were assembled via hot deformation, with a hot deformation ratio between 2% and 95%, and said structural element further comprising an aluminium alloy selected from the group consisting of the 2XXX, 4XXX, 6XXX, 7XXX and 8XXX alloys containing lithium,
wherein incorporated within said monolithic structural element there is provided at least one sensor in the form of a fiber, said sensor enabling detection of damage to and/or fracture of the structural element and further wherein a substantial portion of a surface of said sensor is in contact with at least one aluminium alloy of said monolithic structural element, and wherein said sensor is incorporated between said at least two metal subparts.

* * * * *